United States Patent
Ito (10) Patent No.: US 8,571,515 B2
(45) Date of Patent: Oct. 29, 2013

(54) MOBILE TERMINAL

(75) Inventor: Koichi Ito, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 737 days.

(21) Appl. No.: 12/398,578

(22) Filed: Mar. 5, 2009

(65) Prior Publication Data

US 2009/0305661 A1 Dec. 10, 2009

(30) Foreign Application Priority Data

Jun. 9, 2008 (JP) .............................. P2008-150849

(51) Int. Cl.
*H04M 11/00* (2006.01)

(52) U.S. Cl.
USPC ...................... 455/405; 455/404.2; 455/414.1

(58) Field of Classification Search
USPC ........ 455/405, 566–567, 141.1, 404.2, 412.1; 379/142.01, 196
See application file for complete search history.

(56) References Cited

U.S. PATENT DOCUMENTS

| | | | |
|---|---|---|---|
| 6,643,370 B1 * | 11/2003 | Kurihara et al. | 379/355.02 |
| 7,289,614 B1 * | 10/2007 | Twerdahl et al. | 379/142.01 |
| 2001/0051911 A1 * | 12/2001 | Marks et al. | 705/37 |
| 2002/0045466 A1 * | 4/2002 | Teranishi | 455/567 |
| 2004/0141016 A1 * | 7/2004 | Fukatsu et al. | 345/856 |
| 2005/0096092 A1 * | 5/2005 | Lee | 455/564 |
| 2005/0117729 A1 * | 6/2005 | Reding et al. | 379/196 |
| 2006/0025112 A1 * | 2/2006 | Hamanaga et al. | 455/412.1 |
| 2007/0165806 A1 * | 7/2007 | Bocking et al. | 379/142.01 |
| 2007/0287504 A1 * | 12/2007 | Lim et al. | 455/566 |
| 2009/0106778 A1 * | 4/2009 | Pomeroy et al. | 719/328 |

FOREIGN PATENT DOCUMENTS

| | | |
|---|---|---|
| JP | 63-191446 A | 8/1988 |
| JP | 08-163223 A | 6/1996 |
| JP | 2005-236871 A | 9/2005 |
| WO | WO99/22505 A1 | 5/1999 |

OTHER PUBLICATIONS

JP Office Action dated Mar. 21, 2012 as received in application No. 2008-150849.

* cited by examiner

*Primary Examiner* — Jinsong Hu
*Assistant Examiner* — Nathan Taylor
(74) *Attorney, Agent, or Firm* — Maschoff Brennan (57) ABSTRACT

A mobile terminal as a mobile terminal includes a storage unit which stores an action pattern record table having at least one action pattern registered preliminarily in correlation with addressee information, a control unit which obtains position information of the mobile terminal via a GPS antenna to identify the action pattern based on the position information obtained by a receiver in reference to the stored action pattern record table responding to the request for activating a redial function, and a main display which displays the addressee information in accordance with the priority of the addressee information correlated with the action pattern identified by the control unit in reference to the action pattern record table.

10 Claims, 8 Drawing Sheets

```
┌─────────────┐          ┌─────────────┐
│ Y.ıl ▭      │          │ Y.ıl ▭      │
│ 3/6  A      │          │SUNDAY IN PARK│
│ 3/5  HOME   │          │ 3/1  D      │
│ 3/5  03-****-****│     │ 3/3  C      │
│ *           │  ═════>  │ 3/1  WIFE   │
│ 3/4  B      │          │ 3/4  B      │
│ 3/4  OFFICE │          │ 3/5  HOME   │
│ 3/3  C      │          │      .      │
│ 3/3  04-****-****│     │      .      │
│ *           │          │      .      │
│ 3/1  D      │          │             │
└─────────────┘          └─────────────┘
   FIG. 6A                   FIG. 6B

┌─────────────┐          ┌─────────────┐
│ Y.ıl ▭      │          │ Y.ıl ▭      │
│ 3/21 A      │          │FRIDAY ON THE│
│ 3/5  HOME   │          │WAY HOME     │
│ 3/5  03-****-****│     │ 3/5  WIFE   │
│ 3/4  B      │          │ 3/4  HOME   │
│ 3/4  OFFICE │          │ 3/4  OFFICE │
│ 3/3  04-****-****│     │ 3/6  A      │
│ 3/1  D      │          │ 3/4  B      │
│      .      │          │      .      │
│      .      │          │      .      │
└─────────────┘          └─────────────┘
   FIG. 6D                   FIG. 6C
```

ACTION PATTERN RECORD TABLE

| ACTION PATTERN NO. | DAY | PLACE | ROUTE | CALL TIME | NUMBER OF CALL | ADDRESSEE |
|---|---|---|---|---|---|---|
| ACTION PATTERN1 | SUNDAY | PARK |  | 3/1 10:00 | 15TIMES | D |
|  | SUNDAY | PARK |  | 3/3 21:05 | 13TIMES | C |
|  | SUNDAY | PARK |  | 3/1 13:30 | 10TIMES | WIFE |
|  | SUNDAY | PARK |  | 3/4 10:45 | 7TIMES | B |
|  | SUNDAY | PARK |  | 3/5 21:30 | 3TIMES | HOME |
|  | SUNDAY | PARK |  | ⋮ | ⋮ | ⋮ |
| ACTION PATTERN2 | FRIDAY |  | ON THE WAY HOME | 3/5 18:30 | 20TIMES | WIFE |
|  | FRIDAY |  | ON THE WAY HOME | 3/4 18:29 | 17TIMES | HOME |
|  | FRIDAY |  | ON THE WAY HOME | 3/4 18:21 | 10TIMES | OFFICE |
|  | FRIDAY |  | ON THE WAY HOME | 3/6 18:15 | 9TIMES | A |
|  | FRIDAY |  | ON THE WAY HOME | 3/4 18:18 | 5TIMES | B |
|  | FRIDAY |  | ON THE WAY HOME | ⋮ | ⋮ | ⋮ |
| ⋮ |  |  |  | ⋮ |  |  |

FIG. 7

ACTION PATTERN RECORD TABLE

| ACTION PATTERN NO. | DAY | PLACE | ROUTE | CALL TIME | NUMBER OF CALL | ADDRESSEE |
|---|---|---|---|---|---|---|
| ACTION PATTERN1 | SUNDAY | PARK | | 3/21 10:02 | 16TIMES | D |
| | SUNDAY | PARK | | 3/3 21:05 | 13TIMES | C |
| | SUNDAY | PARK | | 3/1 13:30 | 10TIMES | WIFE |
| | SUNDAY | PARK | | 3/4 10:45 | 7TIMES | B |
| | SUNDAY | PARK | | 3/5 21:30 | 3TIMES | HOME |
| | SUNDAY | PARK | | : | : | : |
| ACTION PATTERN2 | FRIDAY | | ON THE WAY HOME | 3/5 18:30 | 20TIMES | WIFE |
| | FRIDAY | | ON THE WAY HOME | 3/4 18:29 | 17TIMES | HOME |
| | FRIDAY | | ON THE WAY HOME | 3/4 18:21 | 10TIMES | OFFICE |
| | FRIDAY | | ON THE WAY HOME | 3/6 18:15 | 9TIMES | A |
| | FRIDAY | | ON THE WAY HOME | 3/4 18:18 | 5TIMES | B |
| | FRIDAY | | ON THE WAY HOME | : | : | : |
| : | : | | | : | | |

MOBILE TERMINAL

BACKGROUND OF THE INVENTION

1. Field of the Invention

The present invention relates to a mobile terminal, and more particularly to a mobile terminal such as a cellular phone which can easily search the addressee with whom a user desires to communicate, by a redial function.

2. Description of the Related Art

Recently, a cellular phone as a mobile terminal has been getting sophisticated to includes not only the communication function realized by simply calling but also the address-book function, mail function via the network such as the base station and the internet, the browsing function which allows the user to browse Web pages, the music control function which allows the user to listen to audio data, and the function for receiving the digital terrestrial one-segment broadcasting wave.

A redial function is well known as the basic function of the cellular phone. Generally, the addressee information stored in a redial memory is displayed on the screen of the cellular phone so as to easily search the addressee with whom a user desires to communicate, by a redial function.

The art which relates to the redial function is disclosed in Patent Document of International Publication No. WO99/22505. In the technology proposed in the Patent Document, the information of the addressee communicated with the user through the call is stored in the memory region such that the information of the addressee communicated with higher frequency among those listed in the record is set to be inerasable. The addressee information stored in the memory region is displayed for outgoing call. The thus designated or selected addressee is never erased from the redial memory even if the user calls the other addressees frequently thereafter. This makes it possible to improve the usability for the user.

Recently, the cellular phone with the large screen capable of providing high-definition display has been proposed. The high intensity device has been in widespread use as the display such as an organic EL besides a TFT liquid crystal display of mainstream type. The screen size of the display which has been increased is restricted. The number of addressees according to the addressee information which can be displayed on the screen at a time is limited as well. Display of a large number of addressees requires the user to search the desired addressee by scrolling the screen.

The size of the character displayed on the screen may be reduced for the purpose of displaying more addressees on the screen. However, the addressee information having the character size reduced is likely to be illegible for aged users. Increase in the screen size of the display may enlarge the casing of the cellular phone as well. Thus, the increase in the screen size of the display is limited.

SUMMARY OF THE INVENTION

Accordingly, it is an object of the present invention to provide a mobile terminal which can easily search the addressee with whom a user desires to communicate, without deteriorating the usability.

The mobile terminal according to the present invention includes a storage unit configured to store an action pattern table having at least one action pattern registered preliminarily in correlation with addressee information, an receiver configured to obtain position information with respect to the mobile terminal, an controller configured to identify the action pattern based on the position information obtained by the information receiver in reference to the action pattern table stored in the storage unit upon reception of a request for activating a redial, and a display unit configured to display the addressee information in reference to the action pattern table in accordance with a priority of the addressee information correlated with the action pattern identified by the controller.

The mobile terminal according to the present invention includes a storage unit configured to store an action pattern table having at least one action pattern registered preliminarily in correlation with addressee information, an receiver configured to obtain information indicating a current status related to the mobile phone, an controller configured to identify the action pattern based on position information indicating the current status obtained by the information receiver in reference to the action pattern table stored in the storage unit upon reception of a request for activating a redial, and a display unit configured to display the addressee information in accordance with a priority of the addressee information correlated with the action pattern identified by the controller in reference to the action pattern table.

The present invention allows the user to efficiently and easily search the addressee with whom the user wants to communicate without deteriorating the usability.

DESCRIPTION OF THE PREFERRED EMBODIMENTS

Figure 1A:
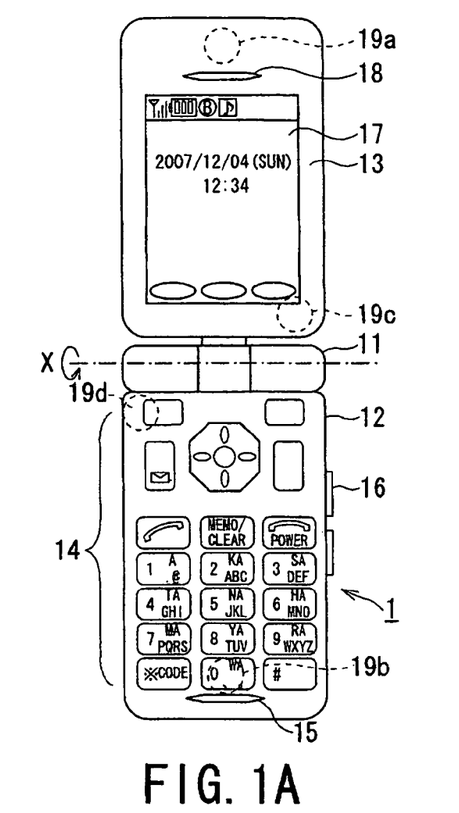
FIG. 1 shows an outer appearance of a cellular phone applicable as a mobile terminal according to the present invention.
Figure 1B:
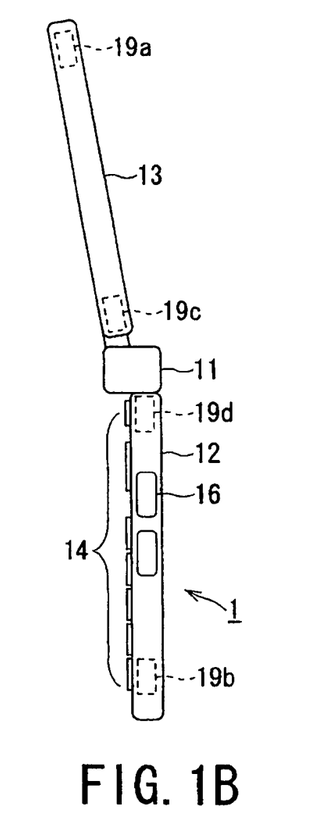

Embodiments of the present invention will be described referring to the drawings. FIG. 1 shows an outer appearance of a cellular phone 1 applicable as a mobile terminal according to the present invention. FIG. 1A shows the outer appearance as a front view of the cellular phone 1 opened at about 180°. FIG. 1B shows the outer appearance as a side view of the opened cellular phone 1.

As illustrated in FIG. 1A and FIG. 1B, the cellular phone 1 includes a first housing 12 and a second housing 13 that are hinge-connected to each other with a hinge part 11 in the middle. The cellular phone 1 is formed so as to be foldable in an arrow X direction via the hinge part 11. A transmission/reception antenna (antenna 31 shown in FIG. 3 to be described below) is built in the cellular phone 1 at a predetermined position. The cellular phone 1 may transmit and receive radio waves with a base station via the built-in antenna.

The first casing 12 includes operation keys 14 formed thereon, for example, alphanumeric keys "0" to "9", a outgoing call key, a redial key, a power key, a clear key and an e-mail key. It is possible to input various instructions by using the operation keys 14.

The first casing 12 includes an arrow key and an enter key as the operation keys 14 at the upper side for moving the cursor vertically and horizontally in association with the vertical and horizontal operation of the arrow key performed by the user. Specifically, various operations such as scrolling of the phone list and the e-mail message displayed on a main display 17 of the second casing 13, rolling up/down of the simple homepage, and forwarding the image.

Various functions may be enabled by depressing the enter key. For example, on the first casing 12, the desired phone number is selected from those in the list of the telephone directory displayed on the main display 17 in response to the user's operation of the arrow key. When the enter key on the first casing 12 is pressed down, the selected phone number is entered to call the corresponding addressee.

The e-mail key is provided to the left of the arrow key and the enter key on the first casing 12. The mail transmission/reception function may be enabled by pressing down the e-mail key on the first casing 12. A browser key is provided to the right of the arrow key and the enter key. The user is allowed to browse data on the Web page by pressing down the browser key on the first casing 12.

A microphone 15 is provided downwards the operation keys 14 on the first casing 12 for collecting the user's voice on the phone. The first casing 12 is further provided with a side key 16 for operating the cellular phone 1.

A battery pack is inserted into the back surface of the first casing 12. Upon turning the power key ON, electric power is supplied from the battery pack to the respective circuits for activating the cellular phone.

On the other hand, the main display 17 is provided on the surface of the second casing 13 for displaying the electric wave reception state, remaining battery level, names and phone numbers of addressees stored in the telephone directory, transmission record, e-mail contents, simple homepage, images picked up by the CCD camera (CCD camera 20 shown in FIG. 3 to be described later), contents received from the external contents server, and contents stored in the memory card (memory card 46 shown in FIG. 3 to be described later). A telephone receiver (earpiece) 18 is provided at a predetermined position upwards the main display 17, which allows the user to have voice communication. A speaker (speaker 50 shown in FIG. 3) is provided at a predetermined position of the cellular phone 1 as a sound output unit other than the telephone receiver 18.

Magnetic sensors 19a, 19b, 19c and 19d for detecting the state of the cellular phone 1 are disposed at predetermined positions inside the first casing 12 and the second casing 13, respectively. The main display 17 may be formed as the organic EL display, or the liquid crystal display.

Figure 2A:
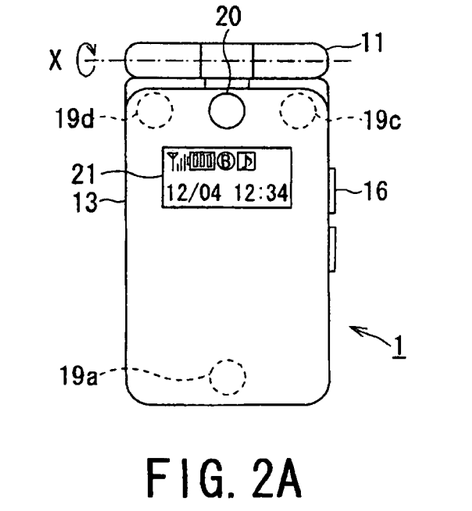
FIG. 2 shows another outer appearance of the cellular phone applicable as the mobile terminal according to the present invention.
Figure 2B:
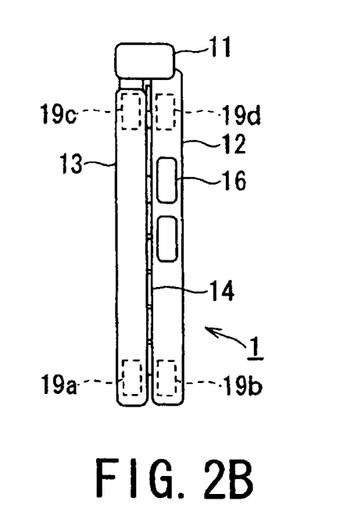

FIG. 2 shows another outer appearance of the cellular phone 1 applicable as the mobile terminal according to the present invention. The cellular phone 1 shown in FIG. 1 has the casing turned in the arrow X direction into the state shown in FIG. 2. FIG. 2A shows the outer appearance as the front view of the cellular phone 1 in the closed state. FIG. 2B shows the outer appearance as the side view of the cellular phone 1 in the closed state.

The CCD camera 20 is provided on the upper unit of the second casing 13 which allows the user to pick up the desired image pickup subject. A sub-display 21 is disposed downwards the CCD camera 20 for displaying an antenna pictograph indicating the current antenna sensitivity level, a battery pictograph indicating the current remaining battery level, and a current time.

Figure 3:
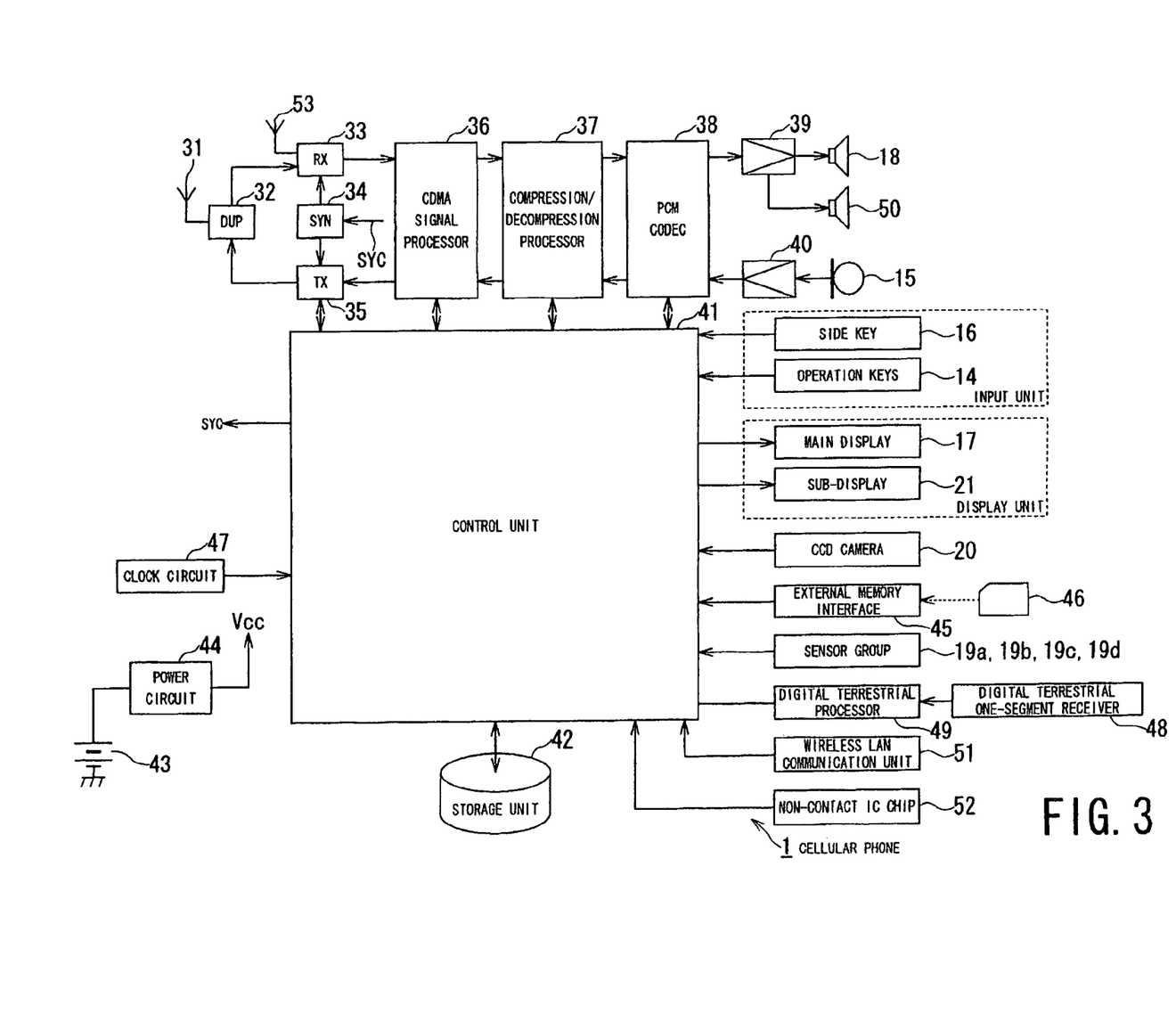
FIG. 3 is a block diagram showing the inner configuration of the cellular phone applicable as the mobile terminal according to the present invention.

FIG. 3 shows the inner structure of the cellular phone 1 applicable as the mobile terminal according to the present invention. A radio signal transmitted from the base station is received by the antenna 31, and then input to a reception circuit 33 via an antenna duplexer 32. The reception circuit 33 mixes the received radio signal with a local oscillation signal output from a frequency synthesizer 34 to down-convert the received radio signal into an intermediate frequency signal. Then, the reception circuit 33 generates a reception baseband signal by performing a quadrature demodulation (quadrature detection) on the down-converted intermediate frequency signal. The reception circuit 33 outputs the generated baseband signal to a CDMA signal processor 36. The frequency of the local oscillation signal generated from the frequency synthesizer 34 is indicated by a control signal SYC output from a control unit 41.

The CDMA signal processor 36 is provided with a RAKE receiver. In the RAKE receiver, a plurality of paths included in the reception baseband signal are de-spread with respective spread codes (i.e., spread codes equivalent to those of the spread reception signals). Then, after the phase in the despread signals of the respective paths is adjusted, the despread signals of the respective paths are coherently RAKE-combined by the RAKE receiver. A data series obtained through the Rake combining is subjected to de-interleaving, channel decoding (error correction decoding), and binary data determination. Thus, reception packet data in a predetermined transmission format can be obtained. The reception packet data is input to a compression/decompression processor 37.

The compression/decompression processor 37 is composed of a digital signal processor (DSP). The compression/decompression processor 37 separates the reception packet data output from the CDMA signal processor 36 in a multi-plexer/demultiplexer for each media, and perform a decoding processing on the separated data for each media. In the call mode, the speech data corresponding to the voice on the phone contained in the reception packet data are decoded with a speech codec. If the video data are contained in the reception packet data as in the TV phone mode, the video image data may be decoded using a video codec. The reception packet data as downloaded contents are extended, and then output to the control unit 41.

The digital speech signal obtained by decoding is supplied to a PCM codec 38. The PCM codec 38 PCM-codes the digital speech signal output from the compression/decompression processor 37, and outputs an analog audio signal obtained by the PCM decoding to a reception amplifier 39. The analog speech signal is amplified with the reception amplifier 39 and then output by the telephone receiver 18.

The digital video image signal decoded by the compression/decompression processor 37 with the video codec is input to the control unit 41. The controller 41 causes the main display 17 to display the video image based on the digital video image signal output from the compression/decompression processor 37 via a video RAM such as a VRAM). The control unit 41 causes the main display 17 to display not only the received video image data but also those picked up by the CCD camera 20 via the video RAM.

If the reception packet data is a e-mail, the compression/decompression processor 37 supplies the e-mail as the reception packet data to the control unit 41. The control unit 41 causes a storage unit 42 to store the e-mail supplied from the compression/decompression processor 37. The control unit 41 reads the e-mail stored in the storage unit 42 in response to the user's operation of the operation key 14 as the input unit and causes the main display 17 to display the read e-mail.

Meanwhile in the call mode, the speech signal (analog speech signal) of the speaker (user) input to the microphone 15 is amplified by a transmission amplifier 40 to a proper level, and PCM coded by the PCM codec 38. A digital audio signal obtained by the PCM coding is input to the compression/decompression processor 37. A video image signal output from the CCD camera 20 is digitized by the control unit 41, and input to the compression/decompression processor 37. The e-mail as the text data generated by the control unit 41 is also input to the compression/decompression processor 37.

The compression/decompression processor 37 may compression-code the digital speech signal output from the PCM codec 38 in a format corresponding to the predetermined transmission data rate to generate the speech data. The compression/decompression processor 37 compression-codes the digital video image signal output from the control unit 41 to generate the video image data. The compression/decompression unit 37 causes the multiplexer/demultiplexer to multiplex the speech data and the video image data in accordance with a predetermined transmission format. The compression/decompression processor 37 packetizes the data multiplexed in the multiplexer/demultiplexer. The compression/decompression processor 37 outputs the transmission packet data after the packetization to the CDMA signal processor 36. When an e-mail message is output from the control unit 41, the compression/decompression processor 37 similarly causes the multiplexer/demultiplexer to multiplex the e-mail message into transmission packet data.

The CDMA signal processor 36 uses a spread code assigned to a transmission channel to perform spread spectrum processing on the transmission packet data output from the compression/decompression processor 37, and outputs an output signal generated by the spread spectrum processing to a transmission circuit (TX) 35. The transmission circuit 35 modulates the signal after the spread spectrum processing by using a digital modulation method such as a QPSK (Quadrature Phase Shift Keying) method. The transmission circuit 35 synthesizes the transmission signal after the digital modulation with the local oscillator signal generated from the frequency synthesizer 34 to up-convert the transmission signal into the radio signal. Then, the transmission circuit 35 high-frequency-amplifies the radio signal generated by the up-conversion so as to obtain the transmission power level indicated by the control unit 41. The high-frequency-amplified radio signal is supplied via the antenna duplexer 32 to the antenna 31, and is transmitted from the antenna 31 to the base station.

The cellular phone 1 includes an external memory interface 45 with a slot through which a memory card 46 is detachably inserted. The memory card 46 is of a flash memory card type, for example, NAND type flash memory card, NOR type flash memory card and the like, and allows various data including the video, audio and music data to be written and read through a 10-pin terminal. The cellular phone 1 further includes a clock circuit (timer) 47 for accurately measuring the present time.

The control unit 41 includes a CPU, a ROM, and a RAM. The CPU executes various types of processing in accordance with the program stored in the ROM or various application programs including the operating system loaded from the storage unit 42 to the RAM, and generates various control signals so as to be supplied to the respective units for centrally controlling the cellular phone 1. The RAM stores the data required for the CPU to execute various types of processing.

The storage unit 42 includes a flash memory element as the non-volatile memory capable of electrically rewriting and erasing data, and a HDD for allowing the CPU of the control unit to store various application programs and data groups. A power circuit 44 generates a predetermined operation power voltage Vcc based on the output of a battery 43 so as to be supplied to the respective circuits. The battery 43 forms the battery pack including a not shown protection circuit.

A digital terrestrial one-segment receiver 48 receives the digital terrestrial one-segment broadcasting wave and the digital terrestrial one-segment radio broadcasting wave from a broadcasting station, and supplies a TS signal based on the received digital terrestrial one-segment broadcasting wave and the digital terrestrial one-segment radio broadcasting wave to a digital terrestrial processor 49. Upon reception of the digital terrestrial one-segment broadcasting wave by the digital terrestrial one-segment receiver 48, the TS signal based on the digital terrestrial one-segment broadcasting wave therefrom is divided into ESes corresponding to the voice data and the video data, respectively. The thus divided voice data are decoded by a voice decoder (not shown) inside the digital terrestrial processor 49 in a predetermined decode mode, and the divided video data are decoded by a video decoder inside the digital terrestrial processor 49 in a predetermined decode mode. Decoded digital voice signal and digital video image signal are supplied to the control unit 41.

A wireless LAN communication unit 51 performs a wireless LAN communication conforming to a predetermined standard such as the IEEE 802.11a/b/g via a built-in antenna. A non-contact IC chip 52 is used for the wireless communication with an IC reader/writer using various types of information in response to the timing if the cellular phone 1 is brought to be close to the IC reader/writer to receive the electromagnetic wave radiated therefrom.

The GPS wave (GPS information) from a not shown GPS satellite is received by a GPS antenna 53. The GPS information contains the information with respect to the transmission time from each of the respective GPS satellites, for example. The GPS information is then input to the control unit 41 via the CDMA signal processor 36. The control unit 41 calculates the position information (latitude/longitude information) indicating the current location of the cellular phone 1 using the obtained GPS information (it is preferable to use three or four pieces of the GPS information) to provide the position information indicating the current location of the cellular phone 1. Generally, the latitude/longitude is obtained as the position information derived from the GPS information. The address information corresponding to the latitude/longitude may be obtained. The address information corresponding to the latitude/longitude may be obtained by accessing the external server. The "position information based on GPS positioning" contains the position information calculated using the GPS information (for example, latitude/longitude information), and the address information corresponding to the calculated position information.

Figure 4A:
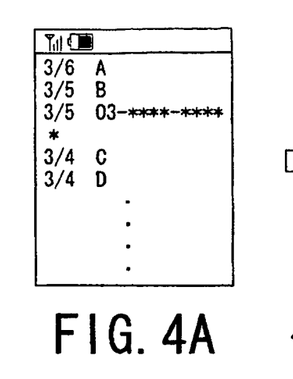
FIGS. 4A to 4C show exemplary redial screens displayed using a generally employed redial function.
Figure 4B:
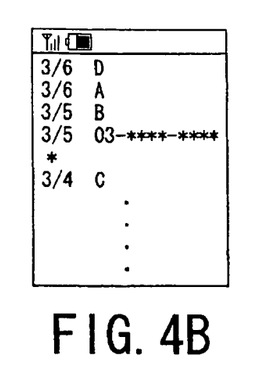
Figure 4C:
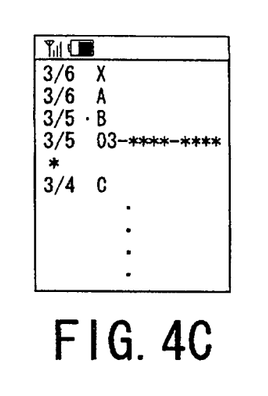

If the addressee "D" who is not a new addressee is selected from the addressee information on the display screen as shown in FIG. 4A and called using the generally employed redial function, the display screen shown in FIG. 4A is changed to the display screen as shown in FIG. 4B, after the call for the addressee "D". The addressee "D" stored as the addressee information is ranked the first priority among all the addressee information, and the rest of the addressee information have the respective priorities lowered by one. The information about the latest called addressee based on the time to start calling is prioritized and listed accordingly so as to be easily called again. If the information about the called addressee is not stored in the redial memory, the new addressee "X" may be ranked and displayed with the first priority among all the addressee information after the call for the new addressee "X", as shown in FIG. 4C. Each of the rest of the addressees has its priority lowered by one.

The display screen of the cellular phone 1 of recent type has been getting large and capable of providing higher definition display. However, increase in the display size is limited, and accordingly, the number of the addressees which can be displayed on the display screen at a time is restricted. When a large number of the addressees are displayed, the user is required to scroll the screen to search the desired addressee information. The size of the character to be displayed on the screen may be reduced for increasing the number of the addressee information to be displayed on the screen. However, especially aged users may feel it difficult to read the small characters of the addressee information. The increase in the display screen size may enlarge the casing of the cellular phone 1, which is restricted as well.

Upon redialing, the cellular phone 1 may search the addressee corresponding to the user's action pattern in accordance with not only the time for redial but also the action pattern of the user until the redialing operation. It is possible to efficiently and easily search the addressee with whom the user desires to communicate without deteriorating the usability for the user. The redial display process through the aforementioned method will be described hereinafter.

The redial display process executed in the cellular phone 1 shown in FIG. 3 will be described referring to the flowchart of FIG. 5.

In step S1, the control unit 41 determines whether or not the request for activating the redial function is received based on the user's depression of any of the operation keys 14 such as the redial key, and is kept standby until it is determined that the request for activating the redial function is received. If the control unit 41 determines that the request for activation the redial function has been received in step S1, the process proceeds to step S2 where it is determined whether or not the redial function has been set to a useful redial function.

If the control unit 41 determines that the redial function has not been preliminarily set to the useful redial function in step S2, the process proceeds to step S3 where the control unit 41 reads the call time information and the addressee information stored in the redial memory region of the storage unit 42, and controls the main display 17 to perform the redial display in the order of the call time based on the thus read call time information and the addressee information. The main display 17 performs the redial display of the addressee information in the order of the call time under the control of the control unit 41. Referring to FIG. 6A, the call time information and the addressee information including, for example, "3/6 A", "3/5 home", "3/5 03-xxx-xxxx", "3/4 B", and the like are redial-displayed in the order of the call time.

In step S4, the control unit 41 receives the addressee information selected from plural addressee information redial-displayed on the main display 17 upon the user's operation of the operation key 14. For example, selection of the addressee "A" from the address information shown in FIG. 6A is received. In step S5, the control unit 41 calls the selected addressee via the antenna 31, the transmission circuit 33 and the CDMA signal processor 36 (that is, connects the line by generating the call signal) in response to the user's depression of the call key as the operation key 14.

In step S6, the control unit 41 updates the call time information and the addressee information stored in the redial memory region of the storage unit 42 after calling based on the called addressee information and the call time information. If the addressee "A" is selected from the addressee information shown in FIG. 6A and called, the call time information and the addressee information stored in the redial memory region of the storage unit 42 are updated. That is, the call time information relevant to the addressee "A" with the highest priority is updated to "3/21". Thereafter, when the redial display is performed in the order of the call time in response to the request for activating the redial function again, the redial display is performed as shown in FIG. 6D.

The process then returns to step S1 where the process subsequent to step S1 is repeatedly executed.

On the other hand, when the control unit 41 determines that the redial function has been preliminarily set to the useful redial function in step S2, the process proceeds to step S7 where the control unit 41 activates the GPS function to allow the GPS antenna 53 to receive the GPS wave (GPS information) from the GPS satellite. The GPS information contains the transmission time information from each of the GPS satellites. The control unit 41 calculates the position information (latitude/longitude information) indicating the current location of the cellular phone 1 using the obtained GPS information, and obtains the position information indicating the current location of the cellular phone 1 while correlating the position information based on the GPS positioning with the time information. Besides the position information based on the GPS wave, the base station position information (area code) transmitted from the base station to the cellular phone 1 may be used. The position information based on the GPS positioning and the time information may be obtained at predetermined time intervals (every one hour or two hours) such that the position information based on the obtained GPS positioning and the time information are time series stored in the storage unit 42.

Figure 7:
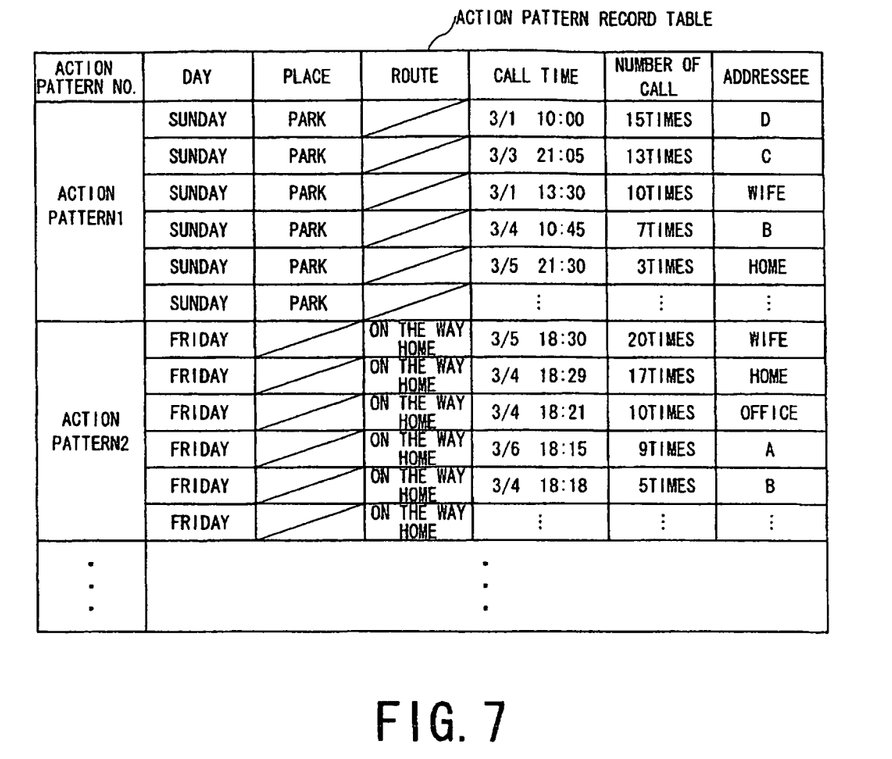
FIG. 7 is a view showing an exemplary action pattern record table stored in a storage unit shown in FIG. 3.

In step S8, the control unit 41 reads the action pattern record table stored in the storage unit 42. FIG. 7 shows an example of the action pattern record table stored in the storage unit 42. Referring to FIG. 7, plural action patterns such as the action patterns 1 and 2 are registered in correlation with the addressee information. The action pattern 1 is registered in correlation with the addressee who was called on "Sunday" from a place around "park", and listed in the descending order of the number of call. More specifically, the addressee information with respect to the addressee "D" with the call time of "3/1 10:00" and the number of call of "15 times" is registered with the highest priority. The addressee information with respect to the addressee "C" with the call time of "3/3 21:05" and the number of call of "13 times" is registered with the second highest priority, and the subsequent addressee information will be registered in the same way.

In step S9, the control unit 41 refers to the read action pattern record table to identify the action pattern of the user who holds the cellular phone 1 in accordance with the position information based on the obtained GPS positioning and the time information. If the position information based on the GPS positioning results in the location around the "park", and the day is "Sunday", the control unit 41 determines that the action pattern of the user who holds the cellular phone 1 corresponds to the "action pattern 1" registered in the action pattern record table. If the current position information based on the GPS positioning is located around the "office", the route is "on the way home", and the day is "Friday", the control unit 41 determines that the action pattern of the user who holds the cellular phone 1 corresponds to the "action pattern 2". The determination with respect to the route may be made in accordance with the position information based on the GPS positioning and the time information as time-series data stored in the storage unit 42. The route may be determined in accordance with the location and time at which the user currently exists, for example, "on the way to work", "on the way to the gym" and the like.

In step S10, the control unit 41 causes the main display 17 to have the redial display by rearranging the addressee information in accordance with the action patterns of the user who holds the cellular phone 1 based on the determination result made in step S9. The main display 17 rearranges the addressee information in accordance with the action pattern of the user who holds the cellular phone 1 to perform the redial display. If it is determined that the action pattern of the user who holds the cellular phone 1 corresponds to the "action pattern 1", the addressee information which have been arranged in the order of the call time as shown in FIG. 6A are rearranged to be displayed as shown in FIG. 6B. Then, the call time information and the addressee information are redial-displayed in the order of the "action pattern 1", for example, from "3/1 D", "3/3 C", "3/1 wife", "3/4 B", "3/5 home", and the like. The text of "Sunday, park" indicating the "action pattern 1" is displayed on the upper unit of the screen of the main display 17.

Figure 6A:
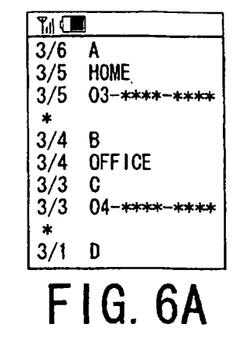
FIGS. 6A to 6D show exemplary redial screens displayed on a main display shown in FIG. 3.
Figure 6B:
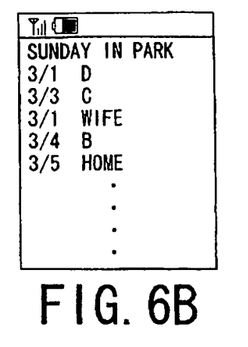
Figure 6C:
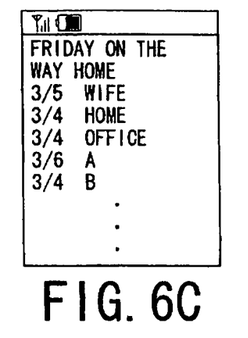

If it is determined that the action pattern of the user who holds the cellular phone 1 corresponds to the "action pattern 2", the addressee information in the order of the call time as shown in FIG. 6A are rearranged to be displayed as shown in FIG. 6C. That is, the call time information and the addressee information are redial-displayed in the order of the "action pattern 2", for example, from "3/5 wife", "3/4 home", "3/4 company", "3/6 A", "3/4 B". The text of "Friday, on the way home" indicating the "action pattern 2" is displayed on the upper unit of the screen on the main display 17. The addressee information registered in correlation with the action pattern other than the "action pattern 2" may be displayed on the lower display region. The addressee information may be displayed in the order of the call time.

This makes it possible to perform not only the redial display simply in the order of the call time but also the one by rearranging the appropriate addressee information correlated with the action pattern of the user who holds the cellular phone 1.

The process proceeds to step S11 where the control unit 41 receives selection of any one of the addressee information from plural addressee information redial-displayed on the main display 17 by the user's operation of the operation key 14. In step S12, the control unit 41 calls the addressee based on the selected addressee information via the antenna 31, the transmission circuit 33 and the CDMA signal processor 36 in response to the user's depression of the call key as the operation key 14.

Figure 8:
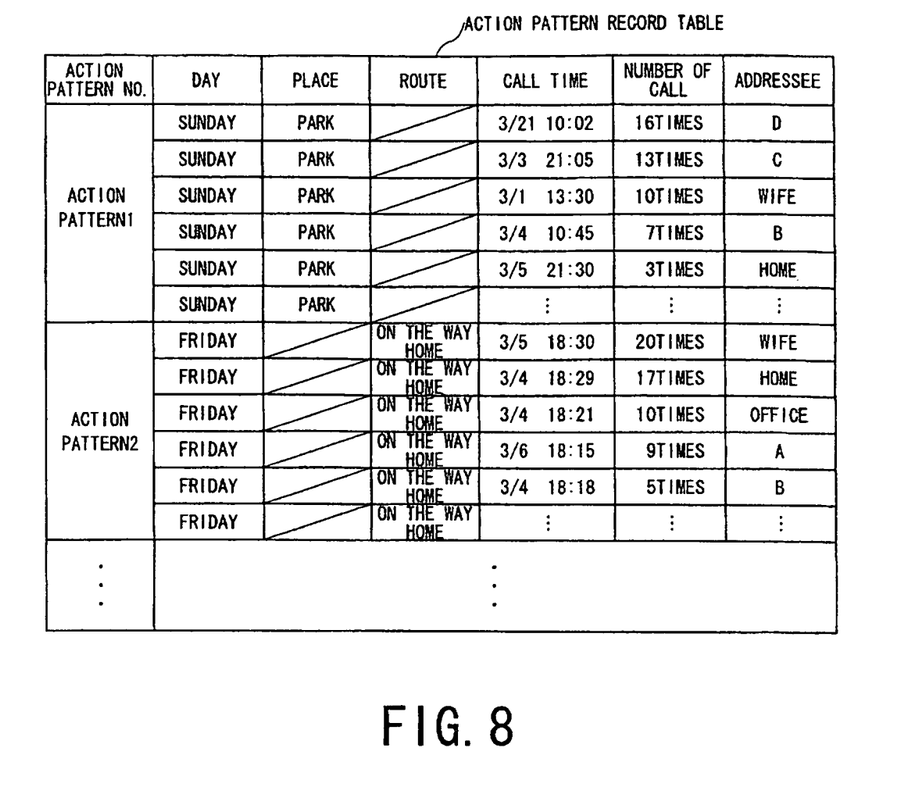
FIG. 8 is a view showing another exemplary action pattern record table stored in the storage unit shown in FIG. 3.

In step S13, the control unit 41 updates the action pattern record table stored in the storage unit 42 based on the addressee information and the call time information with respect to the called addressee after the call. If the addressee "D" is selected from the addressee information shown in FIG. 6B and is called, the action pattern record table stored in the storage unit 42 is updated as shown in FIG. 8. The call time information with respect to the addressee "D" with the highest priority is updated to "3/21 10:02", and the number of call is updated to "16 times".

Thereafter, the process returns to step S1 and subsequent steps where the process is repeatedly executed.

In the embodiment of the present invention, in the case where the position information with respect to the cellular phone is obtained, and the request for activating the redial function is received, the action pattern record table having at least 1 action pattern preliminarily registered is referred. Based on the position information obtained, the action pattern is identified. The addressee information are rearranged and displayed in accordance with the priority of the addressee information correlated with the identified action pattern by referring to the action pattern record table.

With the redial function, the addressee appropriately correlated with the action pattern of the user may be searched and displayed based on the redial place and the action pattern of the user until the redial operation besides the redial time. In the case where the display screen size is limited and the number of the addressees to be displayed on the display at a time is limited, the cellular phone 1 searches the desired addressee information without scrolling the screen or by scrolling as least as possible. As a result, the information of the addressee with whom the user desires to communicate may be efficiently and easily searched without deteriorating the usability for the user. The usability of the redial display may further be improved.

The addressee information may be displayed with large characters on the redial display screen with the small display area.

Upon the redial display of the addressee information, the user's operation of the specific key of the operation keys 14 may switch the redial display between the addressee information rearranged in accordance with the action pattern and the addressee information in the order of the call time.

Figure 5:
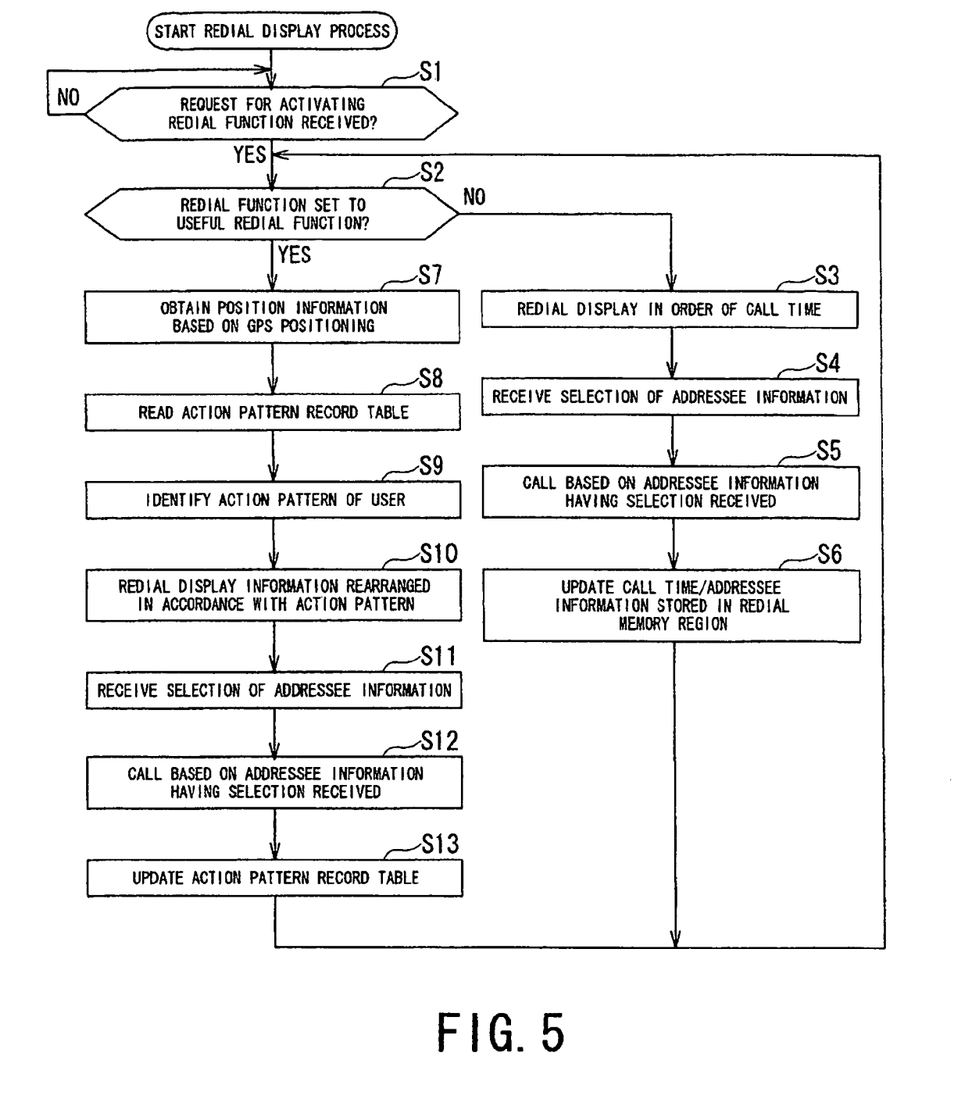
FIG. 5 is a flowchart of a redial display process executed in the cellular phone shown in FIG. 3.
Figure 6D:
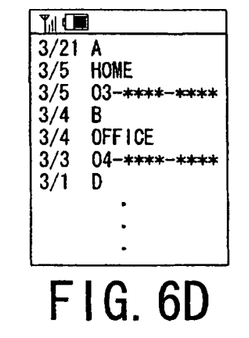
Figure 9A:
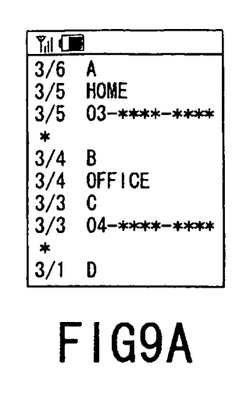
FIGS. 9A to 9C show exemplary redial screens displayed on the main display shown in FIG. 3.
Figure 9B:
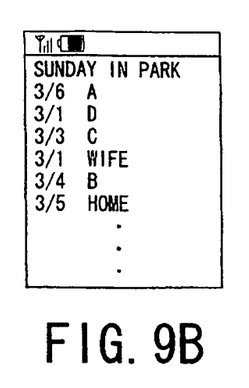
Figure 9C:
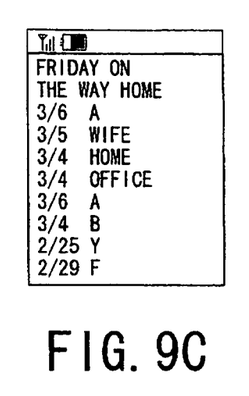

In the case where the redial display is performed in step S10 shown in FIG. 5, the addressee information are rearranged in accordance with the identified action pattern as shown in FIG. 6B or 6C. However, the redial display is not limited to the one as described above. The latest addressee information called on the same day when the request for activating the redial function has been received may be redial-displayed with the highest priority irrespective of the identified action pattern. Specifically, the redial display in the order of the call time as shown in FIG. 9A may be rearranged in accordance with the identified action pattern, and the latest addressee information may be redial-displayed with the highest priority as shown in FIG. 9B or 9C.

This makes it possible to further improve the usability for the redial display.

The size of the character used for the addressee information with the 6th priority or lower is set to be smaller than the character used for displaying the addressee information with the first to the fifth priorities. This makes it possible to display more addressee information upon the redial display while considering the usability for the user.

Upon identification with respect to the user's action pattern, the position information based on the GPS positioning is used. Supposing that the user uses the non-contact IC chip 52 as the IC card which stores data with respect to entering/leaving the office, the name of the shop as the recipient of the user's payment, and usage of the transportation, the user's action pattern may be identified based on the aforementioned information. The aforementioned function installed in the cellular phone, if any, may be used. The determination whether or not the user is currently at home may be made based on the time set for alarming by the alarm function, if any, of the cellular phone 1.

In the embodiment of the present invention, the redial display for the call is described. However, the present invention may be applied to the display with respect to the mail communication record without being limited to the aforementioned explanation.

The present invention is applicable to the PDA, the personal computer, the mobile game machine, the mobile music player, the mobile video player and any other cellular phone without being limited to the cellular phone 1.

The series of the process as described in the embodiment of the present invention may be executed by not only the software but also the hardware.

Steps of the flowchart are time-series executed in the described order in the embodiment of the present invention. However, those steps are not necessarily time-series executed but may be executed in parallel or individually.

The action pattern record table is described in the embodiment of the present invention. The table range does not have to be defined on the memory so long as the action pattern record is stored or the action pattern record is searched by executing the software.

The position information is not limited to the one at the time when the redial function is intended to be used. Any position information may be used so long as the action pattern may be identified. If the user who holds the cellular phone 1 enters the building, the GPS function of the cellular phone 1 cannot be used. However, the position information prior to the entrance is available as well.

What is claimed is:

1. A mobile terminal comprising:
a receiver configured to obtain position information with respect to the mobile terminal in time-series;
a storage unit configured to store an action pattern table including the position information obtained in time-series and having at least one action pattern registered preliminarily in correlation with a plurality of addressee information that are prioritized;
a controller configured to determine a current route in accordance with the position information obtained in time-series and identify the action pattern based on the current route in reference to the action pattern table upon reception of a request for activating a redial;
a display unit configured to display the plurality of addressee information in accordance with the action pattern identified by the controller; and
a setting unit configured to set, and configured to switch between in accordance with a predetermined operation, either a display of the plurality of addressee information in an order of a call time in response to the reception of the request for activating the redial or a display of the plurality of addressee information in an order of the at least one action pattern registered preliminarily in the action pattern table in response to the reception of the request for activating the redial.

2. The mobile terminal according to claim 1, wherein the action pattern table has information which relate to at least a day, a place or a route, an outgoing call time, a number of call, and an addressee registered in correlation with one another.

3. The mobile terminal according to claim 2, wherein the information which relate to the call time and the number of call registered in the action pattern table are updated after calling one of the addressee information displayed on the display unit.

4. The mobile terminal according to claim 1, wherein the display unit displays the plurality of addressee information in accordance with the action pattern or in accordance with a call time.

5. The mobile terminal according to claim 4, wherein the display unit displays the plurality of addressee information corresponding to a latest call time with a generally highest priority.

6. The mobile terminal according to claim 1, wherein the display unit displays an addressee with a size larger than a predetermined size, if a display area related to the display unit is smaller than a predetermined area.

7. The mobile terminal according to claim 1, wherein the display unit displays plural addressees with different sizes in accordance with priorities of the plural addressees.

8. The mobile terminal according to claim 1, wherein the display unit displays one or plural addressees having a priority lower than a predetermined priority, with a size smaller than a size used if the addressee over the predetermined priority is displayed by the display unit.

9. The mobile terminal according to claim 1, wherein the position information obtained by the receiver includes at least position information based on a GPS wave and position information related to a base station.

10. A mobile terminal comprising:
a receiver configured to obtain position information with respect to the mobile terminal in time-series and configured to obtain information indicating a user's use of a predetermined function installed in the mobile terminal;
a storage unit configured to store an action pattern table including the position information obtained in time-series and having at least one action pattern registered preliminarily in correlation with a plurality of addressee information that are prioritized;
a controller configured to determine a current route in accordance with the position information obtained in time-series and identify the action pattern based on the current route in reference to the action pattern table upon reception of a request for activating a redial;
a display unit configured to display the plurality of addressee information in accordance with the action pattern identified by the controller; and
a setting unit configured to set, and configured to switch between in accordance with a predetermined operation, either a display of the plurality of addressee information in an order of a call time in response to the reception of the request for activating the redial or a display of the plurality of addressee information in an order of the at least one action pattern registered preliminarily in the action pattern table in response to the reception of the request for activating the redial.

* * * * *